United States Patent [19]

Huang

[11] 4,306,287

[45] Dec. 15, 1981

[54] SPECIAL ADDRESS GENERATION ARRANGEMENT

[75] Inventor: Victor K. Huang, Scotch Plains, N.J.

[73] Assignee: Bell Telephone Laboratories, Incorporated, Murray Hill, N.J.

[21] Appl. No.: 71,717

[22] Filed: Aug. 31, 1979

[51] Int. Cl.³ .............................................. G06F 9/32
[52] U.S. Cl. ................................................... 364/200
[58] Field of Search ... 364/200 MS File, 900 MS File

[56] References Cited

U.S. PATENT DOCUMENTS

| | | | |
|---|---|---|---|
| 3,394,350 | 7/1968 | Packard | 364/200 |
| 3,533,076 | 10/1970 | Perkins et al. | 364/200 |
| 3,739,345 | 6/1973 | Janssens et al. | 364/200 |

OTHER PUBLICATIONS

Osborne, A., "An Introduction to Microcomputers vol. I," 1976, pp. 5-34 to 5-41.
Osborne, A. et al., "An Introduction to Microcomputers vol. II," 1976, pp. 4-133 to 4-143.
"Signetics Applications Notes re PLAs," Jul. 1975, pp. 4-22.
"Supplement to the TTL Data Book for Design Engineers," 1st Ed., Texas Instruments, 1974, pp. S-296 and S-297.

*Primary Examiner*—Gareth D. Shaw
*Assistant Examiner*—Thomas M. Heckler
*Attorney, Agent, or Firm*—Richard B. Havill

[57] ABSTRACT

A sequential address generation arrangement (45, 61, 62, 99, 102) generates a sequence of addresses in response to an initial address and disables generation of the sequence of addresses in response to a control signal (LAST NIB) produced from at least a portion of the initial address at the conclusion of generation of a predetermined number of sequential addresses, the predetermined number being decoded from the initial address.

3 Claims, 20 Drawing Figures

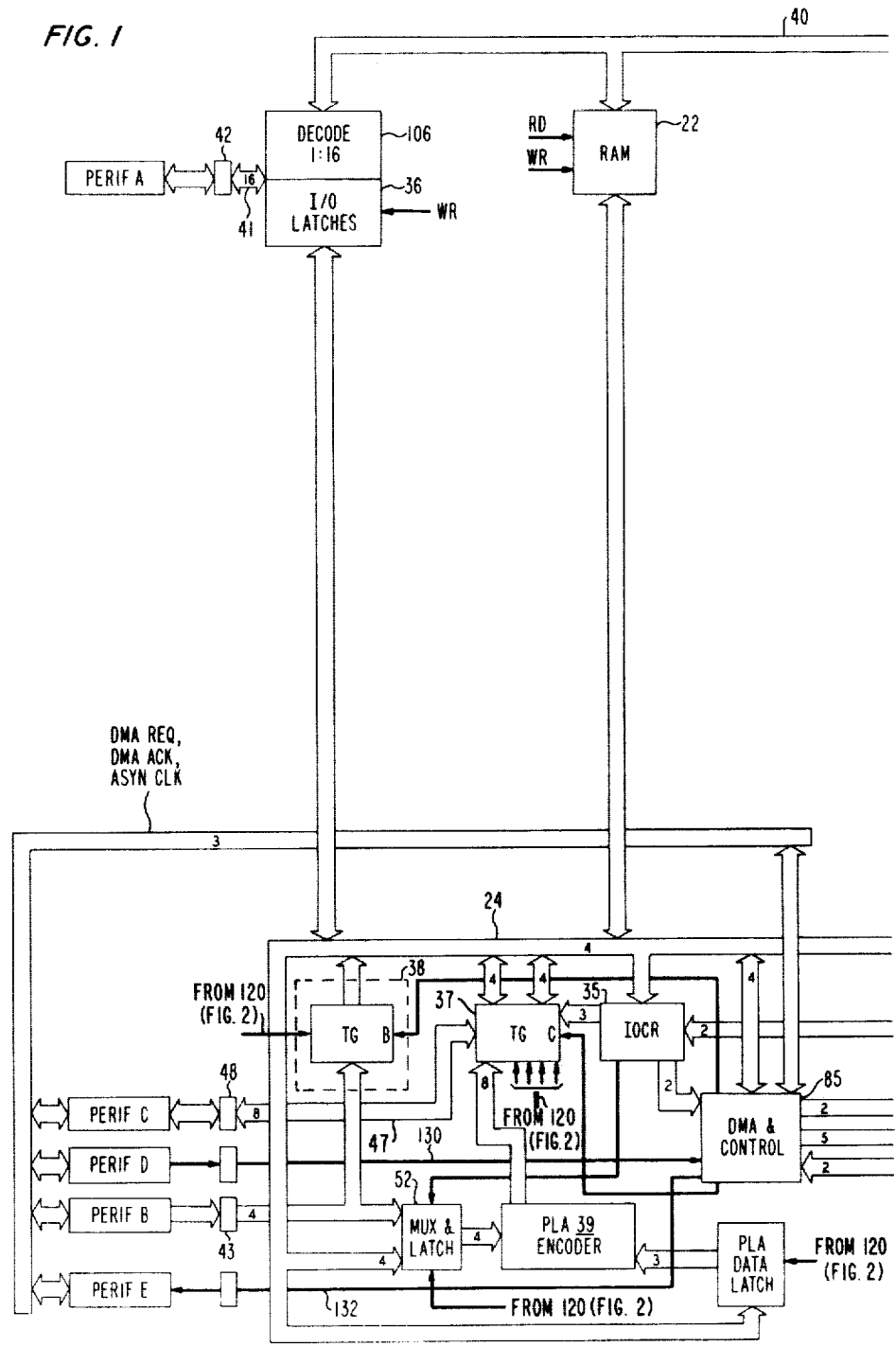

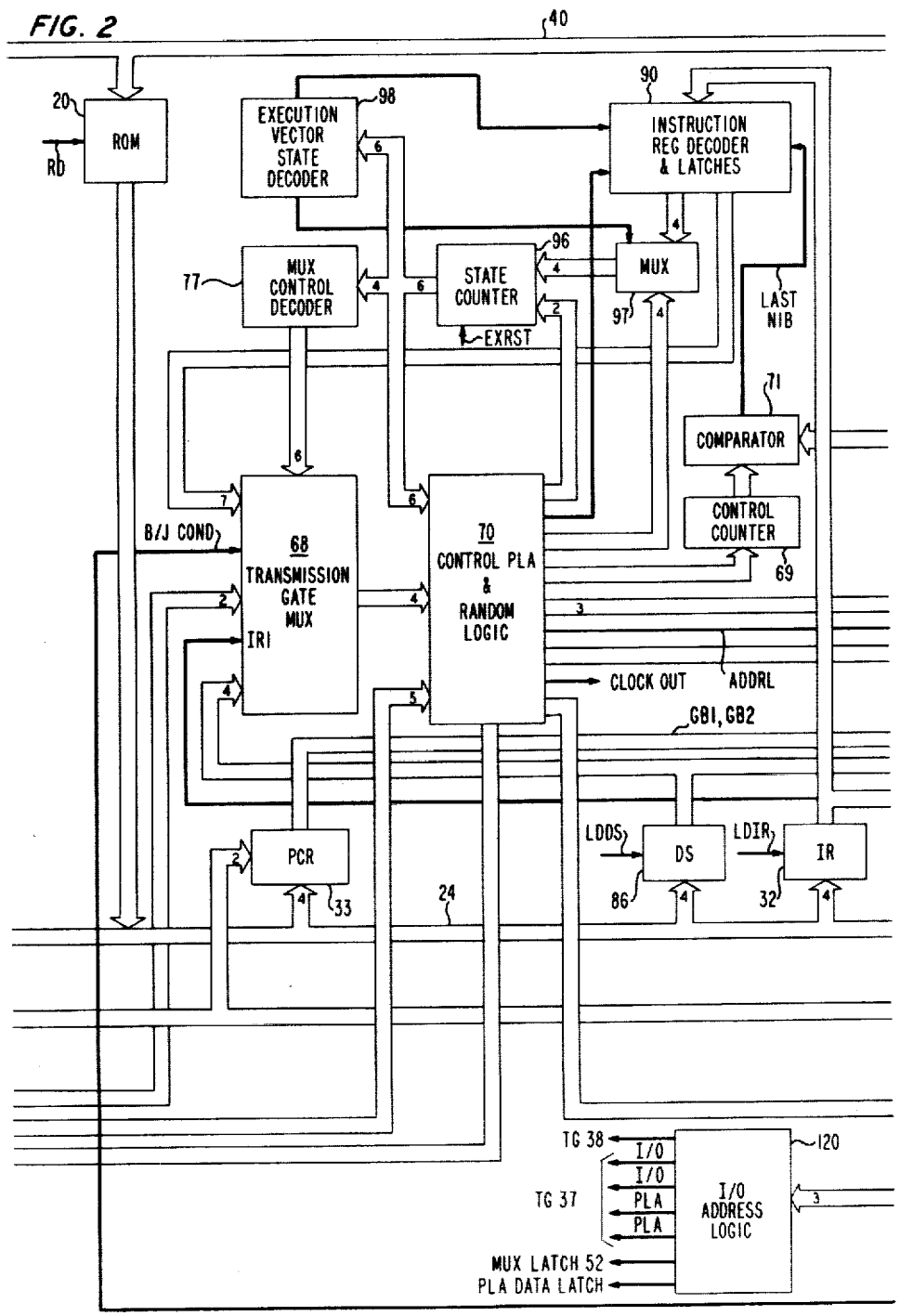

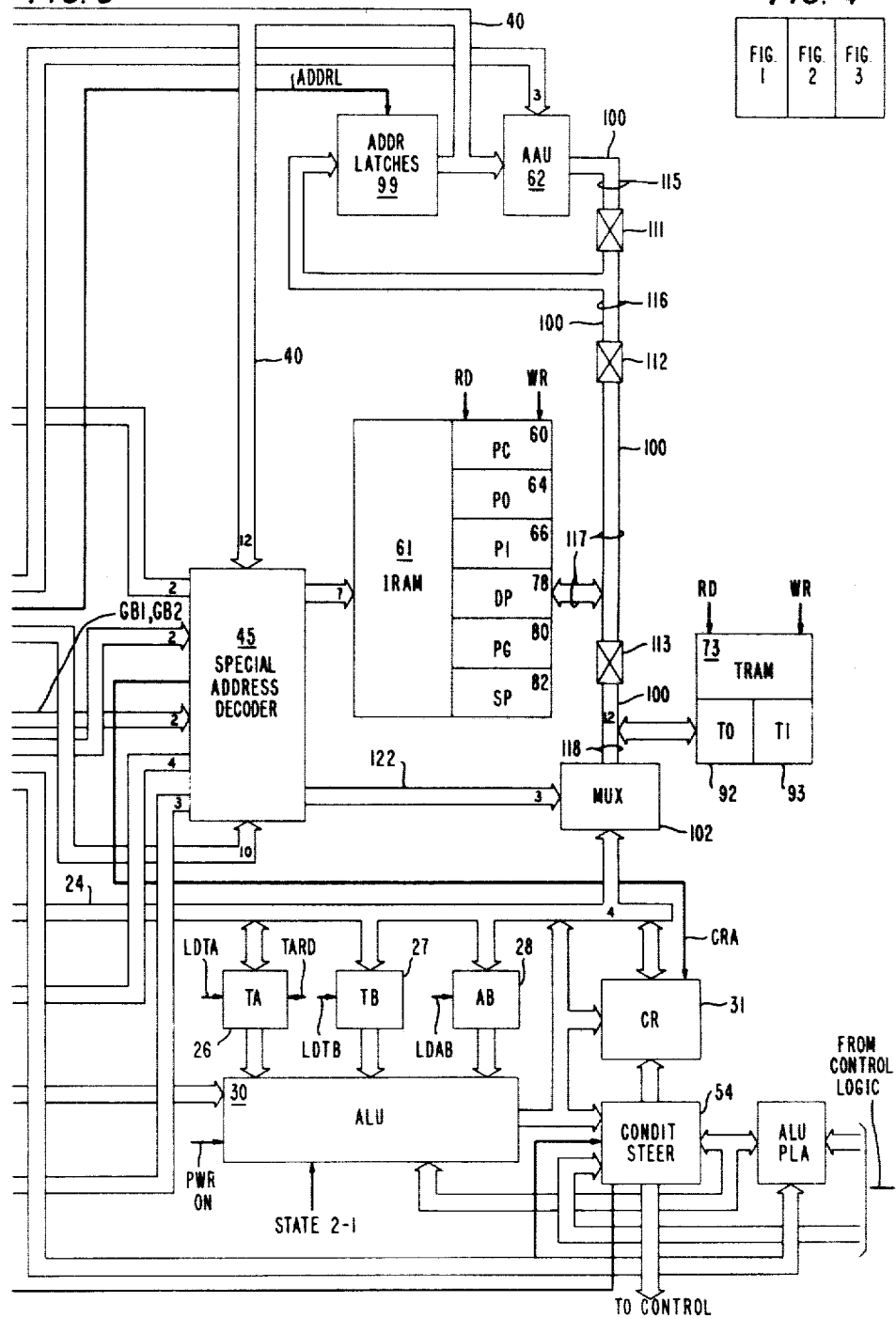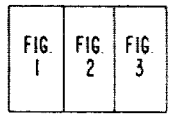

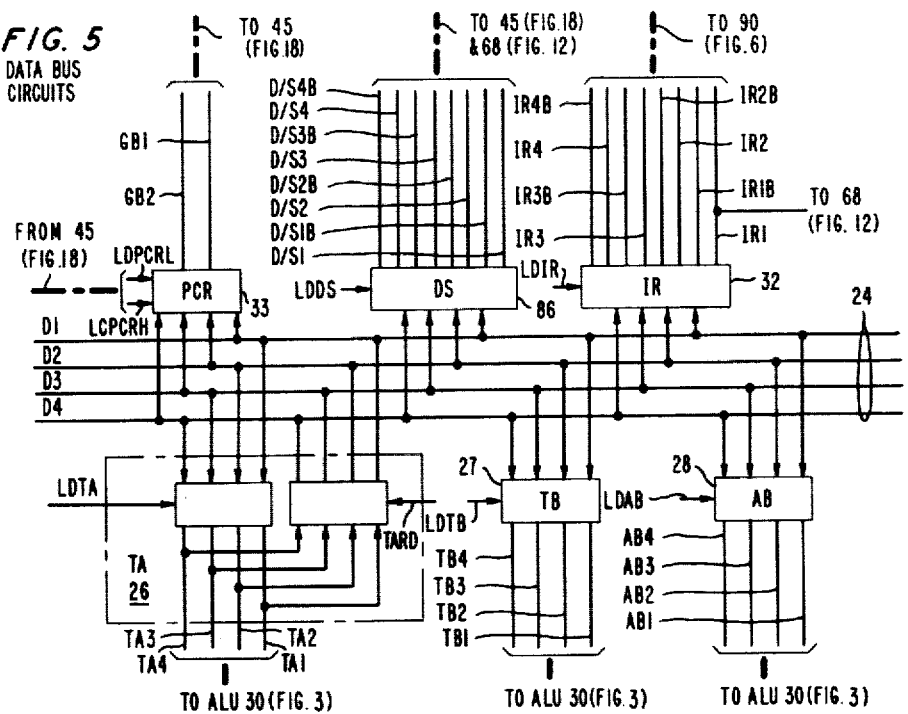
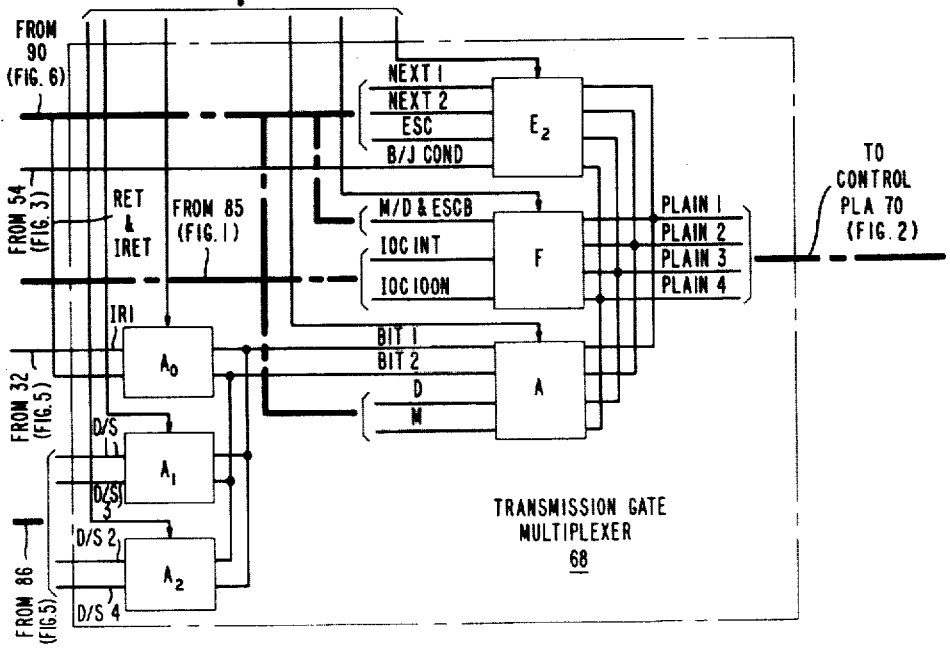

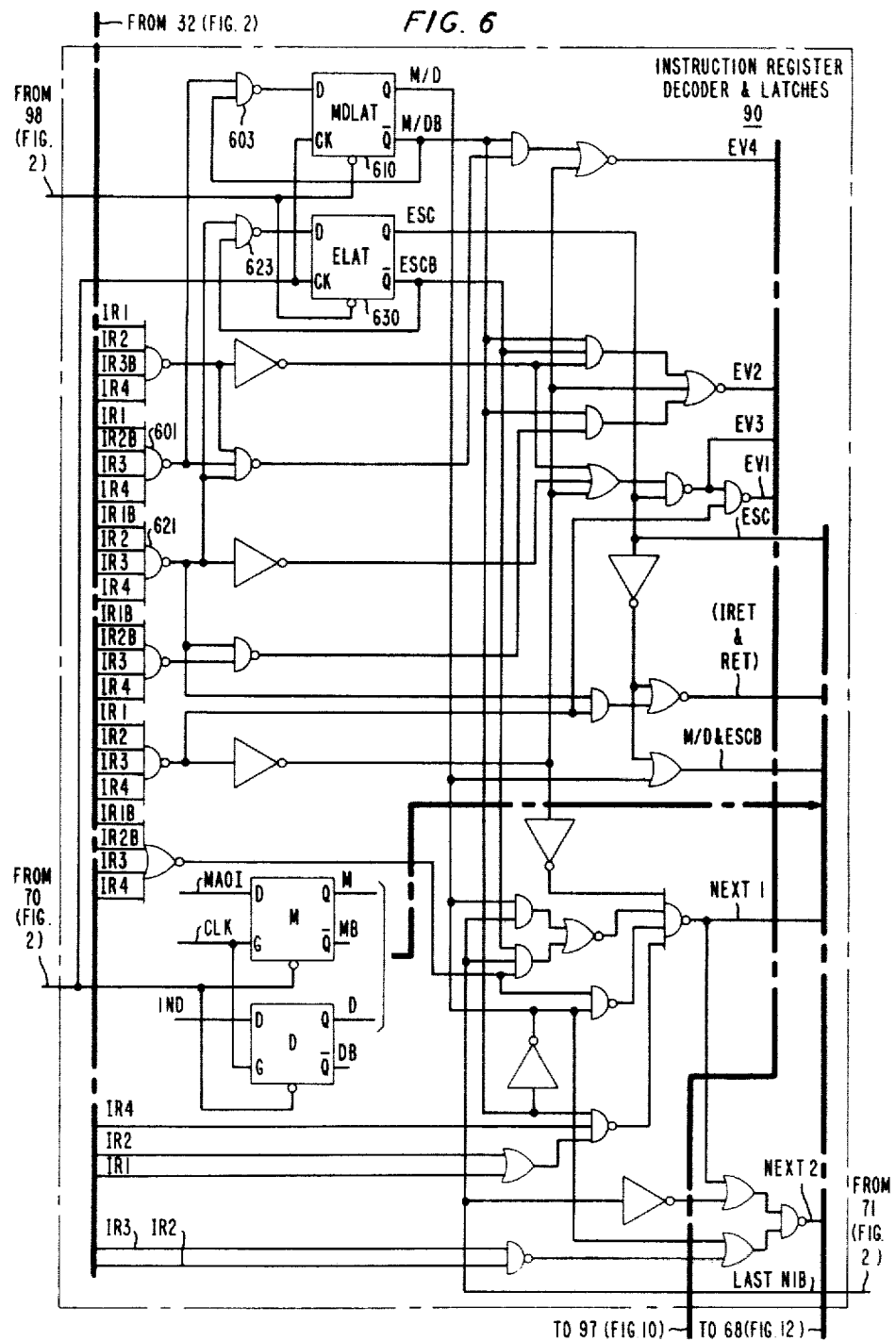

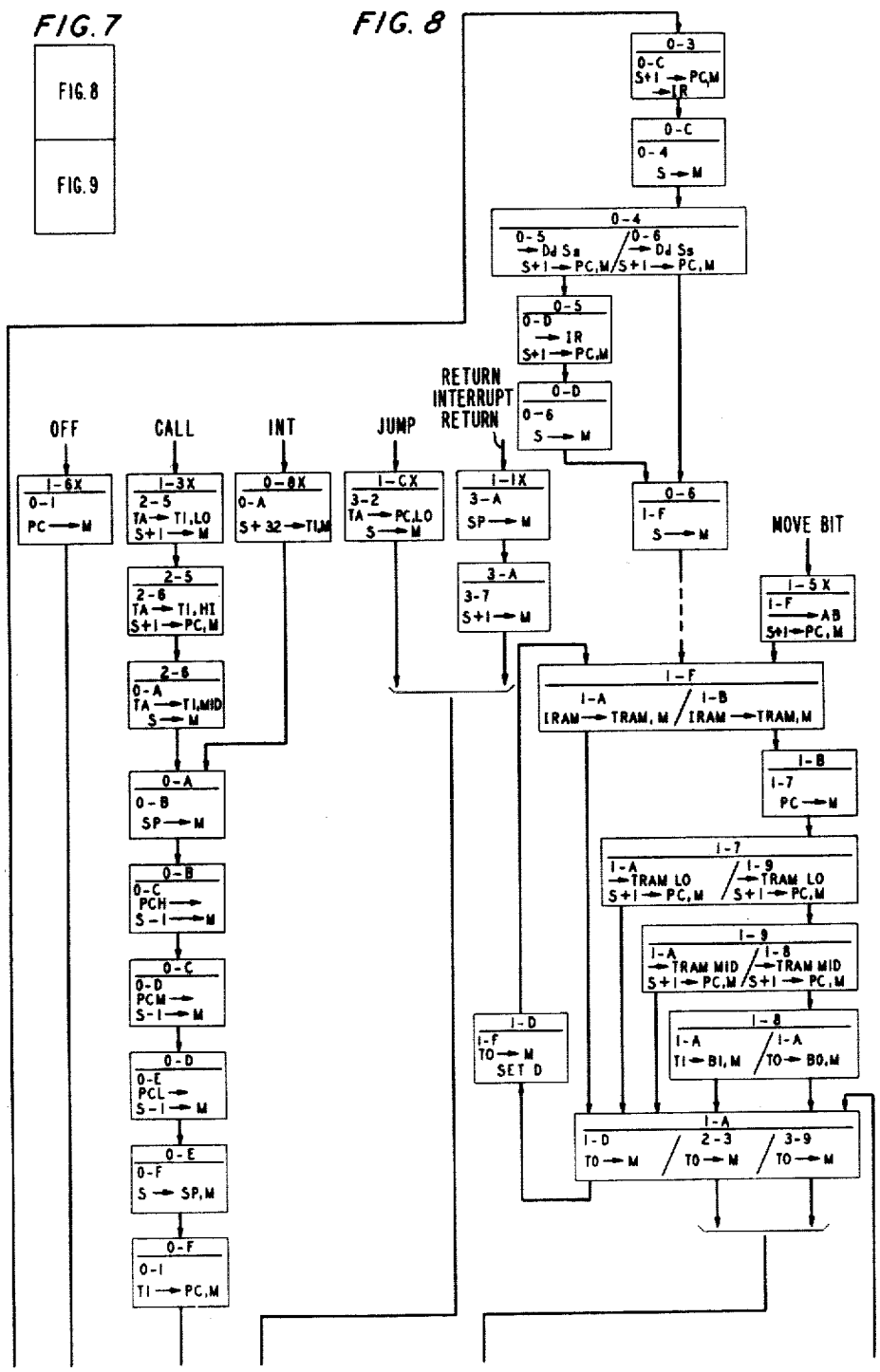

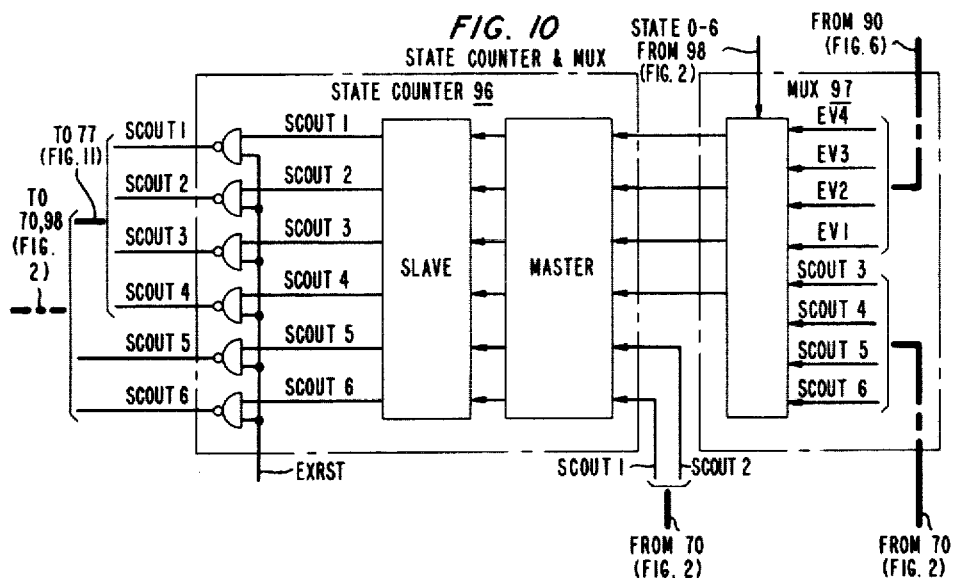
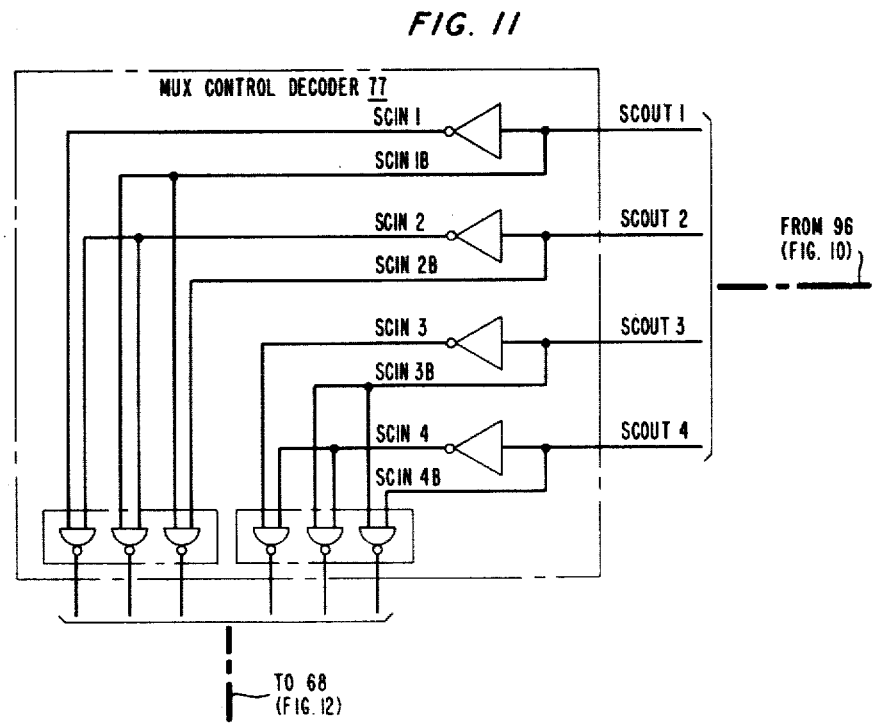

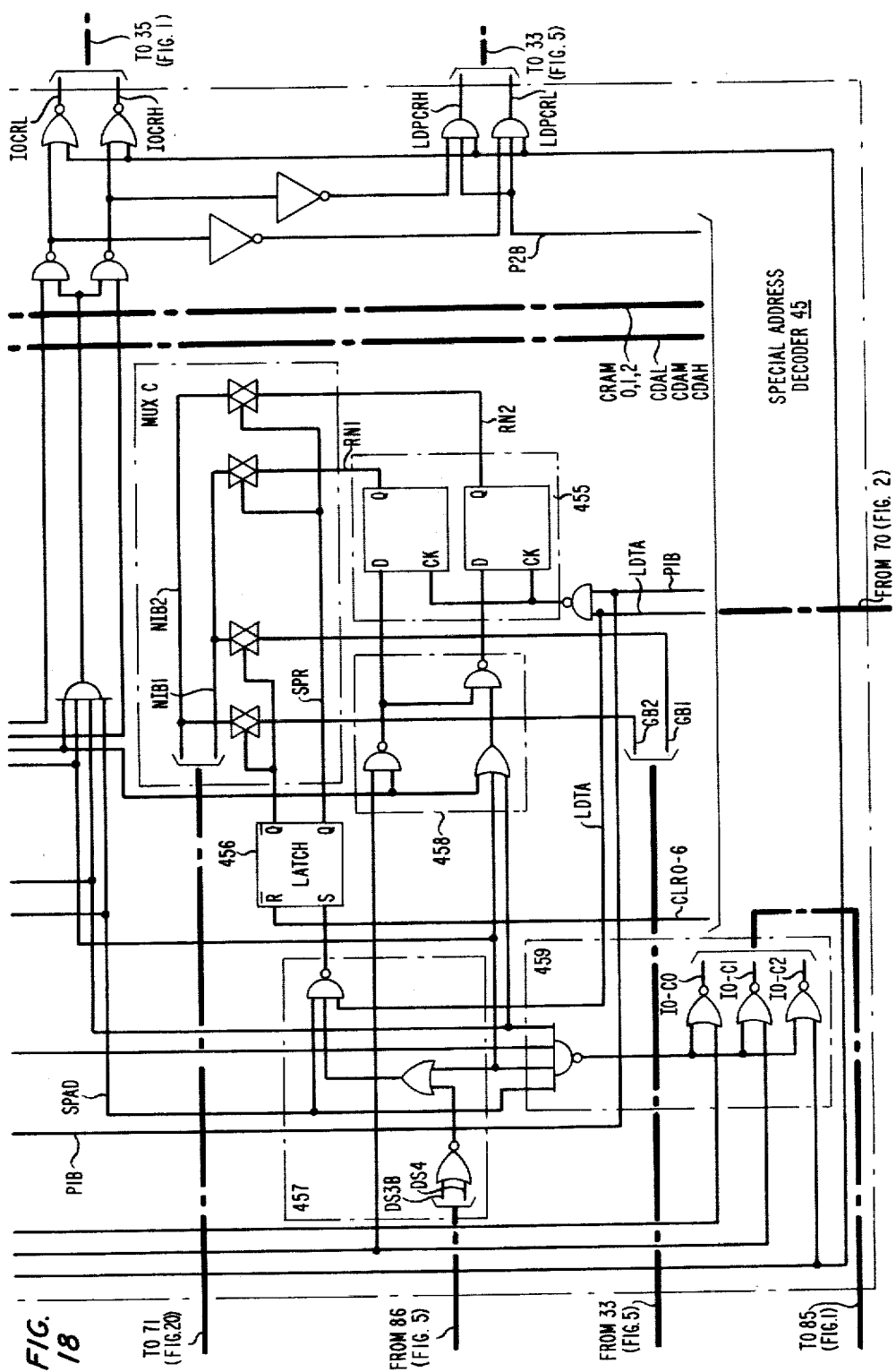

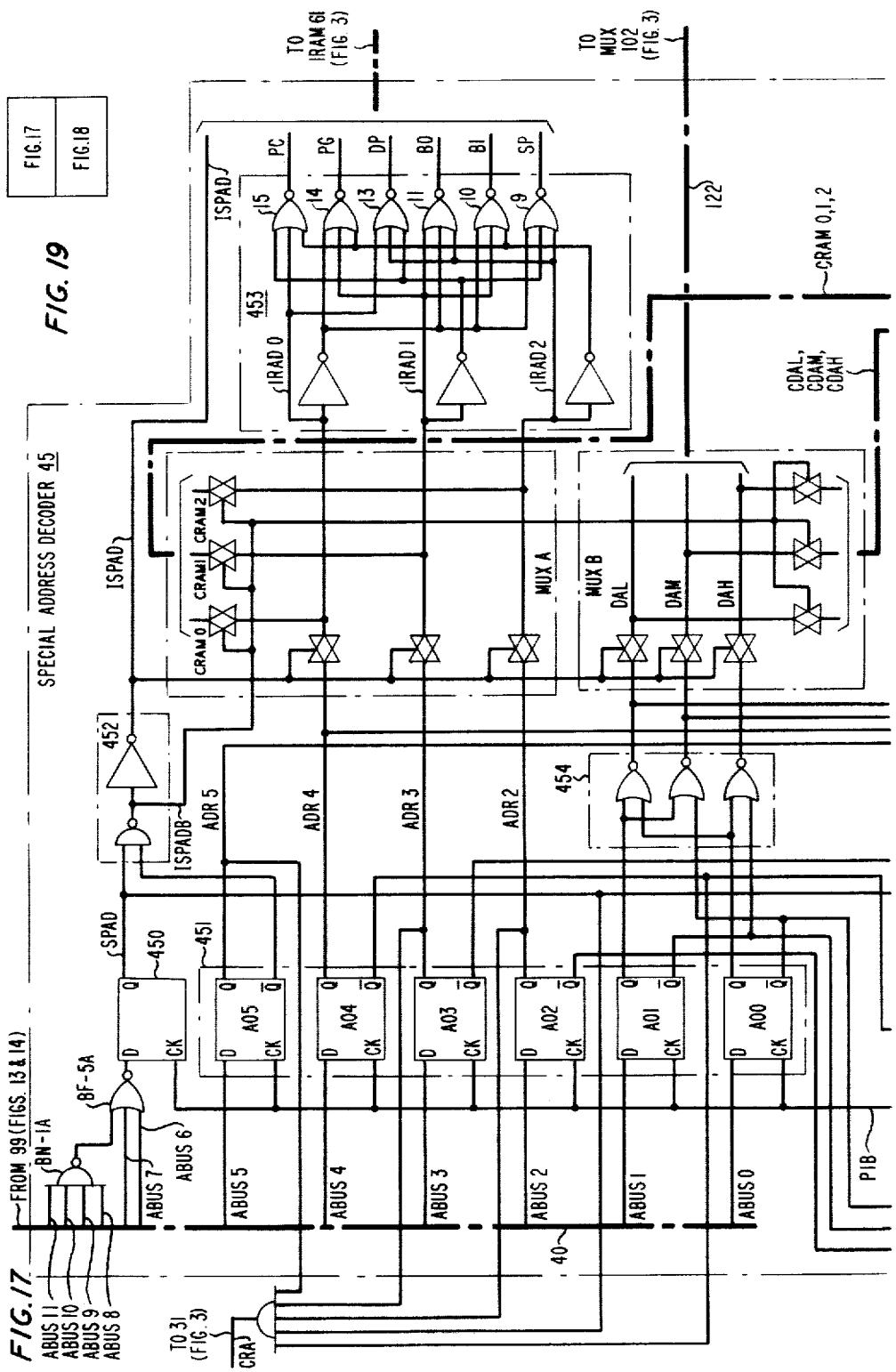

SPECIAL ADDRESS GENERATION ARRANGEMENT

CROSS-REFERENCE TO RELATED APPLICATIONS

Related subject matter is included in the following copending patent applications:

D. E. Blahut-R. L. Ukeiley 7-3, Ser. No. 71,712, entitled "Microcomputer Using Double Opcode Instructions" and filed concurrently herewith;

D. E. Blahut-D. H. Copp-D. C. Stanzione 9-2-2, Ser. No. 974,425, filed Dec. 29, 1978, now U.S. Pat. No. 4,258,419;

D. E. Blahut-D. H. Copp-D. C. Stanzione 10-3-3, Ser. No. 974,363, filed Dec. 29, 1978, now U.S. Pat. No. 4,250,545;

D. E. Blahut-D. H. Copp-D. C. Stanzione 11-4-4, Ser. No. 974,361, filed Dec. 29, 1978, now U.S. Pat. No. 4,240,142; and D. E. Blahut-V. K. Huang-R. L. Townsend, Jr. 14-4-2, Ser. No. 71,750, entitled "Microcomputer Arranged for Direct Memory Access" and filed concurrently herewith.

TECHNICAL FIELD

This invention relates generally to an address generation arrangement and, more particularly, to an arrangement for generating a sequence of addresses in response to an initial address.

BACKGROUND OF THE INVENTION

In the prior art, there are microprocessors, microcomputers and other data processors and computers which have addressable special registers. Typically such registers have a uniform length that is compatible with the width of a data bus included in the particular system. There are reasons, such as for increasing the facility for manipulating address information contained in special registers, that the uniform length constraint should be removed. Then arithmetic and logical manipulation of address information may be accomplished on data words which are longer than the width of the data bus. To accomplish such manipulation of longer data words, plural consecutive addresses are used to define the location of the special registers.

There are arrangements, such as direct memory access circuits, in the prior art for generating plural consecutive addresses from an initial address. A general description of a direct memory access arrangement is presented by A. Osborne in *An Introduction to Microcomputers* Vol. 1, 1976, pages 5-34 to 5-41. The initial address is loaded into an address register and is automatically incremented a number of times. Each time it is incremented it is used to address another part of the data. The number of times that the address is incremented is determined by reference to another piece of information which represents the number. This number is decremented each time the address is incremented. When the number is decremented to zero, the process of sequential address generation is terminated.

The foregoing requires the attention of the programmer to insert the appropriate number of times to increment the address in his program in association with every occurrence of the address of a special register.

For applications wherein access to such special registers occurs often during programming, it is convenient to relieve the programmer of this task.

BRIEF DESCRIPTION OF THE INVENTION

The foregoing problem is avoided by the embodiment of the subject invention which automatically produces a sequence of addresses in response to an initial address and clock signals and which automatically terminates sequential address generation in response to a control signal produced from the initial address at the conclusion of generation of a predetermined number of sequential addresses, the predetermined number being decoded from a portion of the initial address.

BRIEF DESCRIPTION OF THE DRAWING

The invention will be more fully understood from the following detailed description of an illustrative embodiment thereof when that description is read in conjunction with the attached drawing wherein FIGS. 1, 2 and 3, when positioned in accordance with FIG. 4, form a block diagram of a microcomputer;

FIG. 5 is a logic schematic of data bus circuits;

FIG. 6 is a logic schematic of an instruction register decoder and latches;

FIG. 7 shows the positioning of FIGS. 8 and 9 which form a state diagram showing sequences of operations for instructions performed by the microcomputer of FIGS. 1-3;

FIG. 10 is a logic schematic of a state counter and multiplexer;

FIG. 11 is a logic schematic of a decoder;

FIG. 12 is a logic schematic of a transmission gate multiplexer;

FIGS. 17 and 18, when positioned in accordance with FIG. 19, show a logic schematic of a special address circuit and a special latch arrangement.

DETAILED DESCRIPTION

Figure 9:
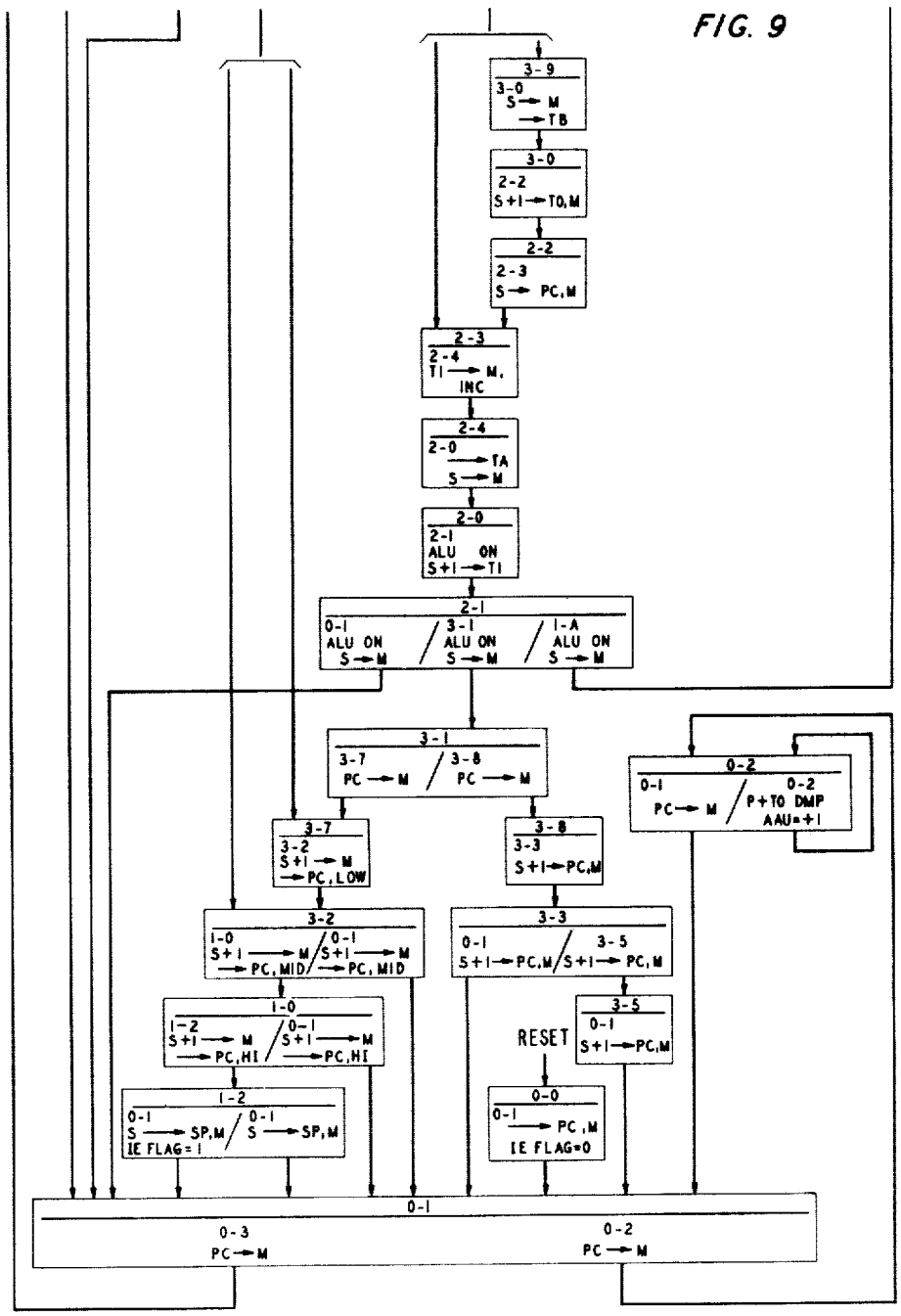

Referring now to FIGS. 1, 2 and 3, there is shown a block diagram of a microcomputer that is fabricated on a single complementary metal oxide semiconductor/-large scale integration (CMOS/LSI) chip. Included on the chip are a read only memory 20 and a random access memory 22 which are coupled through a 4-bit on-chip data bus 24 and a group of temporary registers (TA, TB and AB) 26, 27 and 28 to a 4-bit parallel arithmetic logic unit (ALU) 30. Several other on-chip registers are coupled to the on-chip data bus 24 so that they are addressable by the user. Extensive input/output circuitry and direct memory access circuitry are provided on the chip for increasing the versatility and efficiency of the microcomputer. The memory and registers are to be described in more detail hereinafter.

A controller section, shown mostly in FIG. 2, coordinates and executes sequential operations of the microcomputer while it accomplishes whatever functions are required in accordance with instructions applied thereto from the read only memory 20 or the random access memory 22. The contents of a condition register (CR) 31 are modified as a result of operations occurring in the arithmetic logic unit 30.

Although the arithmetic logic unit 30 is a 4-bit parallel circuit arrangement, it is capable of performing arithmetic and logic operations on either single or multiple nibble operands in response to a single program instruction. In response to information stored in an instruction register (IR) 32 and a processor control register (PCR) 33, the controller section of FIG. 2 determines the mode and the type of operation performed on single and multiple nibble operands. Basically an opcode word, stored in the instruction register 32, determines a processing sequence for designated data.

This sequence may be modified depending upon what information is stored in the processor control register 33. In particular, operations on multiple nibble operands are accomplished by a sequence resulting from such a modification to the processing sequence. This modification to the processing sequence together with decoded control signals, derived in response to special addresses encountered during processing, cause the controller section to vary the number of nibbles of data that are processed by the instruction stored in the instruction register. Generation of such special addresses and the decoding of control signals derived therefrom are discussed in detail hereinafter.

Memory

The memory arrangement includes both the read only memory 20 primarily for program storage and the random access memory 22 primarily for data storage.

Read only memory 20 is presented in FIG. 2 with the controller section because this memory primarily provides instructions for controlling the execution of machine operations. Programming of the read only memory occurs at the mask level and is not alterable.

Random access memory 22 is presented in FIG. 1 with the input/output circuitry because the random access memory often is involved in transfers of data to and from one of a plurality of peripheral devices (A, B, C, D and E) interconnecting with the input/output circuitry and located at the lefthand side of FIG. 1.

Addressable Registers

The microcomputer includes many registers arranged in different ways to accomplish a variety of convenient functions. Some of those registers have been mentioned previously and some have not. All of the registers are to be described in more detail hereinafter. The microcomputer shown in FIGS. 1, 2 and 3 includes ten (10) user addressable registers but unlike most microcomputers there is no pre-assigned accumulator.

User Addressable Special Registers

The user addressable registers include the following registers.

The condition register 31 is a 4-bit set of bistable latch circuits which store signals indicating the status, or condition, of data resulting from arithmetic or logic operations except when the condition register is a destination. The condition register and the condition steering circuit 54 are interposed between the arithmetic logic unit 30 and the internal data bus 24. Both the arithmetic logic unit and the internal data bus are arranged to process 4-bit data in parallel. The condition register is addressable so that it can be accessed for loading and reading by way of the data bus. The status signals, called "flags", include zero, parity, carry, and overflow flags. Although arithmetic operations produce data which may affect any of the four flags, logic operations produce data which may affect only the zero and parity flags and conditional instructions do not affect any of the flags. Because the microcomputer operates on operands having various numbers of nibbles, the flag signals are generated and stored avoiding erroneous intermediate and final flag signals. A group of flag control, or condition steering, circuit arrangements 54 generate this correct status information for all arithmetic and logic operations performed by the microcomputer. Either this status information or information loaded by program control through the data bus 24 is the data stored in the condition register 31.

In the condition register, the zero flag circuit arrangement includes an all zeros logic circuit with a feedback path used for handling accurately multiple nibble operation data. Some logic and timing signals couple the stored all zeros signal to a latch circuit for storage and readout to the data bus 24 while another latch can change state in response to later processing conditions.

Additionally in the condition register, the parity flag circuit also includes a feedback arrangement for handling multiple nibbles. A latch circuit stores the parity signal for retention and readout to the data bus 24 in response to program control.

Also in the condition register, the carry flag circuit includes master and slave latch circuits for receiving and storing carry signals resulting from arithmetic operations in the arithmetic logic unit 30. In response to program control, the carry flag stored in the slave latch can be read out to the data bus 24.

Further in the condition register, the overflow flag circuit is a latch circuit which is controlled by overflow signals generated in the arithmetic logic unit 30.

As previously mentioned, the condition register circuits are addressable and can be written with information present on the internal data bus 24. Alternatively, once information is stored in the condition register 31 that information can be read out onto the internal data bus 24 under program control.

A 12-bit wide program counter (PC) 60 stores the address of the next instruction to be executed. It operates conventionally wherein its contents are set to a hexadecimal address x(000) at the commencement of processing. Thereafter the contents are incremented by an address arithmetic unit (AAU) 62 some specific number of times during each instruction unless the contents are changed during the execution of the current instruction, such as by a jump instruction. Such incrementing continues throughout processing until the desired program sequence is completed.

Memory pointer registers (P0 and P1) 64 and 66 are 8-bit registers used for indirectly addressing memory locations. When used as pointers, they each store the two least significant nibbles of the address being pointed to.

As shown in FIGS. 2 and 5, the processor control register (PCR) 33 is a several bit wide register, two bits GB1 and GB2 of which enable a programmer to set the operand width at either 4, 8, 12, or 16 bits. Processor control register 33 is coupled to the data bus and is arranged as an address in addressable memory space. Information is stored in the register 33 from time to time in accordance with the programmer's requirements. A typical program routine may load the processor control register 33 only once. A "Move" instruction (MOV) is used to load the register 33. The data to be loaded is moved from a specific address to the address of the register 33. That data is stored in the register 33 until some later time when it is changed by another "Move" instruction. Some routines will load and reload the register 33 during a single routine.

Information stored in the processor control register helps control the processing of data in the microcomputer. The two bits, stored in the processor control register for controlling operand width, are coupled through a transmission gate multiplexer 68 to the input of a control programmed logic array (PLA) and random logic circuit 70 where they help determine the sequence of operations performed by the microcomputer.

The two bits of data stored in the processor control register determine how many nibbles each operand includes during the processing of each specific instruction. As previously mentioned the microcomputer is arranged to operate on operands having either 4, 8, 12, or 16 bit widths even though the on-chip data bus 24 and the arithmetic logic unit 30 include circuitry for handling only 4 bits at a time. This is accomplished by acting on the data in serial fashion, 4 bits at a time.

In FIG. 3 the arithmetic logic unit 30, in response to signals from the controller section, steps through specific operations an appropriate number of times to accommodate the various width operands. Each time the arithmetic logic unit performs one of the specified operations requiring an updating of any of the flags, resulting accurate condition information is stored in the condition register 31 and the operation is tallied in a counter 69 by a signal from the control PLA and random logic circuit 70. In the controller section, a comparator 71 compares the state of the counter 69 with the two bits GB1 and GB2 stored in the processor control register 33 and coupled through the special address decoder 45 to the comparator 71. If the counter state does not equal the number stored in the processor control register, the controller section causes the processor including the arithmetic logic unit 30 to repeat the operation propagating any carry and updating parity, zeros, and overflow information resulting from the prior operation on that operand if necessary. When the state of the counter 69 equals the number stored in the processor control register 33, the complete operation on the multiple nibble operand is concluded and the controller section proceeds to the next phase of execution of the instruction. At that time, the condition register 31 contains accurate information relating to the flags resulting from the prescribed operation on the multiple nibble operand.

As previously mentioned, data is loaded into the processor control register 33 only occasionally during operation and typically may be loaded only once per routine or program. Once loaded, that control data remains in the processor control register and in effect determines part of the logical configuration of the processor. This control data stored in the processor control register contributes to the control of processing of data until different control data is loaded into the processor control register. The programmer controls both the loading and the subsequent reloading of the control data into the processor control register in accordance with the specific needs for solving processing problems. Thus the microcomputer logic can be reconfigured from time to time other than by routine instructions to extend the capability of its instruction set. For a more detailed description of the arrangement and operation of the processor control register, the reader should refer to a patent application Ser. No. 974,425, filed in the names of D. E. Blahut, D. H. Copp and D. C. Stanzione on Dec. 29, 1978.

A direct memory access pointer (DP) 78 in FIG. 3 is an addressable 12-bit register which is used both for direct memory access operations and as an efficient counter for counting external events. For direct memory access operations, 12 bits of data are stored therein for pointing to any memory location which is to be a source or a destination of information in the direct memory access transfer. When used as a counter for an iterative external operation, the register 78 is loaded with 12 bits of data which are incremented by the address arithmetic unit 62 during each externally generated clock cycle. The external operation is terminated in response to an overflow signal of the address arithmetic unit 62.

A 4-bit page pointer register (PG) 80 is an addressable register that supplies the middle nibble of 12-bit addresses used for addressing the random access memory 22, the nine other addressable registers, and the input/output circuits 36, 37, and 38. By loading the page pointer register 80 and thereafter using its contents to identify a sixteen (16) nibble block of memory, any location in that block of memory addresses can be addressed very efficiently with a single instruction. The lower nibble is supplied by the instruction from the read only memory 20. The upper nibble of the address is F hexadecimal and is supplied by hardware in the address arithmetic unit 62.

A 12-bit stack pointer register (SP) 82 is an addressable register used for conventional push down stack operation. Data loaded into the stack pointer is used for addressing the last information put on the stack. Under program control the data in the stack pointer is incremented or decremented by the address arithmetic unit 62 as items of information are put onto or are read out of the stack.

The input/output control register (IOCR) 35 in FIG. 1 is an addressable 6-bit register for storing, under program control, information that controls flow of data into and out of the microcomputer. Of the information stored in control register 35, 3-bits are applied to the input gate 37 and 1-bit is applied to the multiplexer (MUX) 52 for determining how data flows through gate 37 and MUX 52. Another 2-bits of the information stored in control register 35 are applied to a direct memory access and control circuit (DMA) 85 for determining whether that circuit is to control serial or parallel and input or output operations.

Addressable Accumulator Registers

As previously mentioned, there is no pre-assigned accumulator. Instead addressing modes allow registers in the random access memory 22 to function as accumulators for various instructions. By use of these registers in the random access memory, the microcomputer can accomplish a memory-to-memory data transfer for dyadic operations without any intermediate step through a permanent accumulator. These registers also function as destination and source registers for many arithmetic and logic functions.

Addressing

All of the storage locations of the read only memory 20, the random access memory 22, the input/output circuits and the previously described addressable registers are assigned locations in addressable memory space. Each address stores one nibble (4 bits wide). The address space is organized into decimal addresses 0 through 4095 or x(000) through x(FFF), wherein x indicates a hexadecimal number. Read only memory occupies the lower addresses starting with address x(000), and random access memory occupies the high addresses ending at x(FFF). The ten addressable registers and the input/output circuits are assigned addresses below the lowest address assigned to random access memory and are addressable like random access memory. Each random access memory location used for the registers has an address wherein the high nibble is F hexadecimal.

There are a variety of addressing modes for forming effective addresses of operands. There are four modes for developing destination addresses and four additional modes for developing source addresses.

The destination addressing modes are:
Mode 0—address is formed by concatenating the 4-bit numeral F hexadecimal with a 4-bit page pointer fetched from the page pointer register 80 and with a nibble provided by the instruction;
Mode 1—direct address;
Mode 2—address is the contents of the memory pointer register 64;
Mode 3—address is the contents of the memory pointer register 66.

The source addressing modes are:
Mode 0—address is formed by concatenating the 4-bit numeral F hexadecimal with the 4-bit page pointer fetched from the page pointer register 80 and with a nibble provided by the instruction;
Mode 1—direct address;
Mode 2—address is the contents of the memory pointer register 64;
Mode 3—immediate data.

The special address decoder 45 receives addresses applied by the address latches 99 through the address bus 40. This decoder converts special addresses for the condition register 31, the processor control register 33, the input/output control register 35, the input/output latches 36, the bidirectional input/output port 37, the inport 38, the program counter 60, the memory pointer registers 64 and 66, the direct memory access pointer register 78, the page pointer register 80 and the stack pointer register 82 to signals which identify and activate the appropriate register, as required during execution of a program.

Other Registers

Other registers in the microcomputer include the instruction register (IR) 32, and the destination/source register (DS) 86.

In FIGS. 2 and 5, the instruction register 32 is a 4-bit latching circuit which is coupled to the on-chip data bus 24 for receiving and storing one nibble of opcode at a time during the execution of each instruction. The first nibble of each instruction is always stored in the instruction register. While that nibble of opcode is stored, the instruction register 32 applied that code to an instruction register decoder and latches 90 within the controller section for partially controlling the sequence of operations during execution of the current instruction.

Referring now to FIGS. 2 and 6, information produced by a logic circuit in FIG. 6, in response to selected ones of the possible first nibbles of opcode, is stored for the duration of the instruction in the latches ELAT 630 and MDLAT 610 in the instruction register decoder and latches 90 for indicating that an additional nibble of opcode is to be used. The second nibble of each instruction is always stored in the destination/source register 86 of FIGS. 2 and 5. For a groups of often used instructions, the first and second nibbles provide sufficient information to prescribe the desired execution sequence.

In response to the information stored in the latches ELAT and MDLAT of the instruction register decoder and latches 90, some instructions fetch a third nibble of the instruction (the second nibble of opcode) from memory and store it in the instruction register 32 in place of the first nibble of opcode. This second nibble of opcode continues partial control of the sequence of operations for the duration of that instruction. Such storage of a first opcode in the latches ELAT and MDLAT, followed by a second opcode replacing the first opcode in the instruction register for continuing partial control of the sequence of operations, is referred to as a double opcode operation. In any instruction using the double opcode operation, the third nibble of the instruction is the second opcode which is stored in the instruction register 32 in place of the first opcode.

In FIG. 6, the instruction register decoder and latches 90 includes two latches (ELAT and MDLAT) 630 and 610 for storing the information generated by a set of NAND gates in response to one of the specific codes of the first nibble of opcode stored in the instruction register 32. The latches ELAT and MDLAT are each set in response to a different opcode combinatin indicating double opcode operations. If the assigned opcode of either of these two latches is not stored in the instruction register 32 during the first nibble of any instruction, that latch remains reset for the entire instruction. On the other hand, if the assigned opcode for one of these latches is stored in the instruction register during the first nibble, that latch is set for the duration of that instruction. Once a latch ELAT or MDLAT is set, it causes the controller section to fetch a second nibble of opcode from read only memory 20 and to reload the instruction register 32 with that second nibble replacing the first nibble. The set state of the latch ELAT or MDLAT together with the second nibble of the opcode stored in the instruction register 32 subsequently controls processing of any data word to be fetched from any addressable storage location. Once either of the latches is set in the instruction register decoder and latches 90, it causes the controller section to step the processor through special steps. A more detailed description of the arrangement and operation of the microcomputer in response to double opcode instructions is included in the aforementioned patent application in the names D. E. Blahut et al, entitled "Microcomputer Using Double Opcode Instructions" and filed concurrently herewith.

As shown in FIGS. 2 and 5, a destination/source register 86 is a 4-bit latching circuit which is coupled to the on-chip data bus 24 for receiving and storing one nibble of addressing mode data during the execution of each instruction. As previously mentioned, the second nibble of each instruction is the nibble which is stored in the destination/source register 86 and is applied to the transmission gate multiplexer 68 for the duration of the current instruction. Two bits of this data coupled through the multiplexer 68 when taken together with information stored in page pointer register 80 are used by the control programmed logic array 70 for determining which one of 16 addresses in a block is to be used as a destination during execution of the current instruction. The other two bits of data from the destination/source register 86 and coupled through the multiplexer 68 when taken together with the information from the page pointer register 80 are used by the programmed logic array 70 for determining which one of the 16 addresses in the block is to be used as a source register during the execution of that same instruction if it is a dyadic instruction. If the instruction is other than a dyadic instruction, these latter two bits of data provide other control information for the control section.

The instruction register decoder and latches 90, as shown in FIG. 6, includes two flip-flops 610, 630 for storing information generated by a logic circuit 603, 623 in response to specific codes stored in the instruction register 32. Each of these flip-flops is set in response to a different opcode combination. One of the flip-flops 610 when set stores an indication that the instruction is either a monadic or a dyadic instruction. The other one of the flip-flops 630 stores an indication that the instruction is a conditional transfer instruction.

Controller Section

As shown in FIG. 2, the controller section of the microcomputer includes the read only memory 20 and the registers 32, 33, and 86 coupled to the on-chip data bus 24. Also the controller section includes the control programmed logic array and random logic 70, a state counter 96, the instruction register decoder and latches circuit 90, and a variety of additional logic circuitry. The sequence of events executed for an instruction is controlled by the controller section. Outputs from the control programmed logic array are latched in a master/slave arrangement. The microcomputer is stepped through a series of states which are represented by rectangles including symbols in FIGS. 8 and 9 which are arranged as shown in FIG. 7.

In FIGS. 8 and 9, each state is identified by a code at the top of the rectangle, e.g., "0-3" and "0-C", located at the tops of the uppermost two rectangles. Each state is determined in sequence by the output of the state counter 96 shown in FIGS. 2 and 10.

During a fetch sequence of operation, two nibbles are fetched from memory and are loaded respectively into the instruction register 32 during stage 0-3 and in the destination/source register 86 during state 0-4. The first nibble is the opcode which is used for basic control of the sequence of subsequent events. The second nibble contains destination and source address information for operands to be used in executing the instruction. Every time the source/destination register 86 is loaded by a control signal LDDS, the register 28 also is loaded. As mentioned for some operations, a third nibble is fetched and is loaded into the same instruction register during state 0-5 for controlling some other sequences of subsequent events. More details are presented in the aforementioned patent application D. E. Blahut et al 7-3.

After the fetch sequence is completed, an execution vector generated by the instruction register decoder and latches circuit 90 may be loaded into the state counter 96 so that the proper sequence of subsequent processing events is commenced. A multiplexer (MUX) 97 in FIGS. 2 and 10 determines whether information from the instruction register decoder and latches circuit 90 or from the control programmed logic array 70 is applied to the state counter 96.

As shown in FIGS. 2 and 10, the state counter is a 6-bit master/slave latch which temporarily retains state information typically generated by the control programmed logic array 70 but at certain times as modified by the execution vector information which is multiplexed, or jammed, into the state counter in lieu of the information from array 70. These times are determined by the decoder 98 which is responsive to the state of the state counter 96. When the state 0-6 occurs, decoder 98 applies a signal to the multiplexer (MUX) 97 for applying the execution vector to the state counter rather than the usual four outputs of the control array 70.

If the instruction is a monadic or dyadic instruction, one or more address pointers are formed and are loaded into one or both of a pair of temporary addressing registers (T0 and T1) 92 and 93 of FIG. 3. Once the addresses are formed, the controller initiates fetching the specified operands from storage and loading them into one or more of the arithmetic logic unit registers 26 and 27. The arithmetic logic unit 30 is then activated to execute the appropriate function and generate a result. Condition flags are set in the condition register 31 in accordance with the results of the arithmetic logic unit operation as processed by the condition steering circuit 54. The comparator 71 of the controller then decides whether or not the arithmetic logic unit 30 should operate on another nibble of operand. This is accomplished by comparing the state of the counter 69 with the operand width stored in the processor control register 33. If another nibble of the operand is to be processed, the controller section fetches an additional nibble or nibbles and activates the arithmetic logic unit an appropriate number of times. This type of operation continues during the execution of each instruction until the number of nibbles processed equals the number representing the operand width as stored in the processor control register 33.

Control Programmed Logic Array

The control programmed logic array 70 of FIG. 2 is an arrangement of logic circuits which perform the logic of a known programmable logic array, such as one described in *Signetics Applications Notes RE PLAs*, Signetics, Inc., July 1975, pages 4-22. As shown in FIGS. 2 and 10, the control programmed logic array 70 has two outputs which are looped through the state counter 96 back to inputs of the array and four which are looped through the multiplexer 97 and the state counter 96 back to inputs of the control programmed logic array for stepping the array through sequences of states during operation of the microcomputer.

As shown in FIGS. 2 and 10, the multiplexer 97 is an 8-to-4 multiplexer. The arrangement and operation of such a multiplexer is well known and may be reviewed by reference to pages S-296 and S-297 of the *Supplement to the TTL Data Book for Design Engineers*, first edition, Texas Instruments, Inc.

As shown in FIGS. 2 and 10, state counter 96 is a master/slave latch having six inputs and six outputs. Two of the inputs SCOUT 1 and SCOUT 2 are applied directly from outputs of the control programmed logic array. The four other inputs are applied from MUX 97. Normally the four inputs from MUX 97 are four additional outputs SCOUT 3-SCOUT 6 from the control programmed logic array. Only during state 0-6 do these four inputs switch over to four execution vector outputs EV1-EV4 from the instruction register decoder and latches 90.

An additional input lead from a chip terminal applies an external reset signal EXRST to the state counter when a user desires to reset the microcomputer. Applying the reset signal forces the output of the state counter to all zeros. Such output will initiate a reset routine.

As shown in FIGS. 2 and 11, the multiplex control decoder circuit 77 includes two sets of logic gates which produce control signals for two sets of transmission gate multiplexers in the multiplexer 68 of FIGS. 2 and 12. Each of these sets of multiplexers includes three transmission gates which are opened and closed by the states of control signals. Only one out of the three gates of each set is closed for transferring information at any one time. Although the operation of the multiplexer 68 is described in greater detail hereinafter, the following briefly describes its operation. Each gate of the first set of transmission gates A0, A1 and A2 in the multiplexer 68 controls the transfer of two pieces of information to a pair of inputs of one transmission gate A of the second set of gates in the multiplexer 68. Each gate of the second set of transmission gates A, F and E2 controls transfer of either three of four pieces of information to four input leads of the control programmed logic array 70.

Execution Vector Logic

As shown in FIGS. 2 and 6, the instruction register decoder and latches 90 is interposed between the instruction register 32 and the state counter 96 in the controller section. Inputs are applied from the instruction register, the control programmed logic array and from an execution vector state decoder 98. Part of the resulting output from the instruction register decoder and latches 90 is called an execution vector. The execution vector includes four bits EV1–EV4, which determine how to execute the current instruction and how to process the current operand. The execution vector is multiplexed with part of the outputs of the control programmed logic array 70 and is loaded into the state counter 96 at a predetermined time during state 0-6 the execution of an instruction.

Once loaded into the state counter, the execution vector determines which one of the states defined in FIGS. 8 and 9 executed thereafter. Each state loaded by way of the execution vector is identified in FIGS. 8 and 9 by the symbon X at the top of the state. This entire execution vector operation enables a large fan out through branches in the sequence chart without requiring an inordinately large chip area for the controller section shown in FIG. 2. By jamming the execution vector into the state counter, many inputs and word lines which otherwise would be required in the control programmed logic array 70 have been eliminated.

As previously mentioned, the execution vector is multiplexed into the state counter alternatively with part of the outputs from the control programmed logic array 70. The execution vector state decoder 98, responsive to the state of the state counter 96, identifies the correct time (state 0-6) at which the execution vector should be jammed into the state counter in lieu of the outputs from the control programmed logic array. An appropriate enabling signal is applied from the decoder 98 to the multiplexer 97. The resulting state thus jammed into the state counter determines which branch of the sequence chart is executed during the rest of the current instruction.

Address Arithmetic Unit, Address Latches and Address Bus

Figures 13, 15:
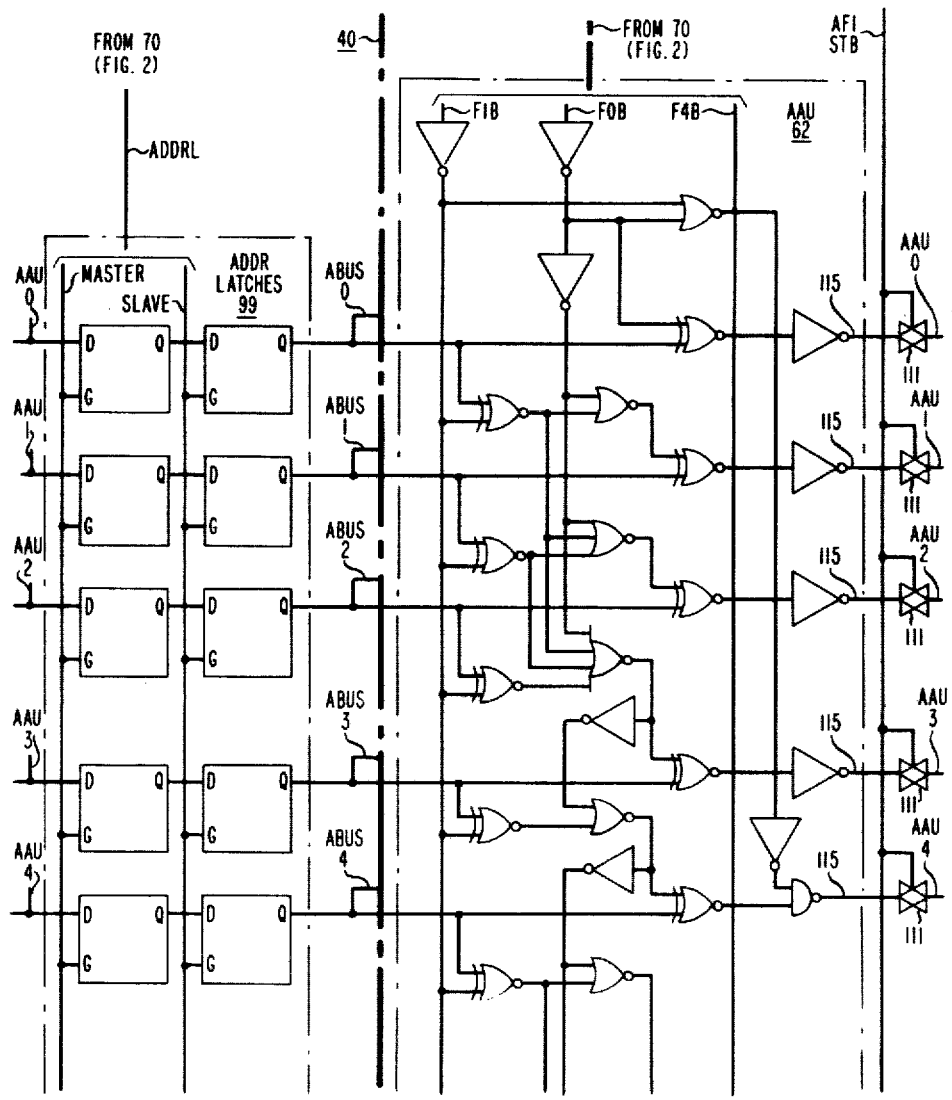
FIGS. 13 and 14, when arranged in accordance with FIG. 15, form a logic schematic of an address arithmetic unit with latches, buses and gates.
Figure 14:
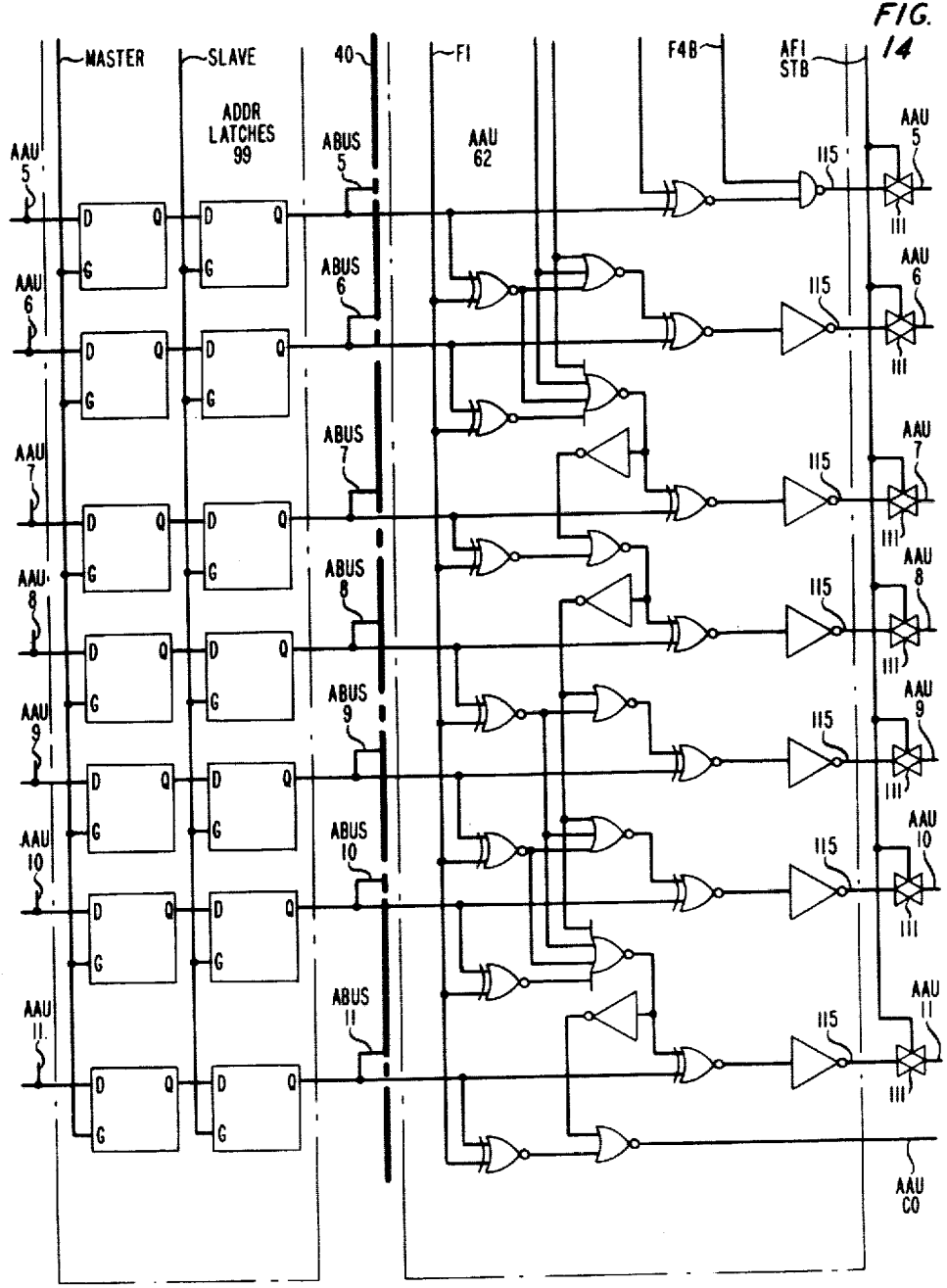

In FIGS. 3, 13 and 14, the address arithmetic unit 62 is a 12-bit parallel arithmetic unit arranged for forming addresses for memory locations as well as for special addresses and for incrementing or decrementing by one any information applied to its input from an address latch circuit 99. Unit 62 is a combinational logic circuit dedicated to address functions.

In addition to basic incrementing and decrementing functions, the address arithmetic unit 62 is arranged to perform three other operations. The five functions are controlled in response to three control signals F0B, F1B and F4B from the control PLA and random logic circuit 70. First of all in response to an NOP code, the unit 62 does nothing. Additionally, it generates either a trap address or an interrupt address, respectively, in response to trap and interrupt codes. These trap and interrupt addresses are generated by first resetting the address data to all zeros in the address latches 99, by gating the masters while the transmission gates 111 are disabled, and thereafter processing the all zeros through the address arithmetic unit while jamming a bit into a selected bit position. Such bit jamming is accomplished by applying signals to leads F0B, F1B and F4B. This generates the address x(020) for an interrupt routine and the address x(010) for trap.

As shown in FIGS. 3, 13 and 14, address latches 99 are a set of 12 parallel master/slave flip-flop circuits, arranged to receive and store temporarily in the masters address data presented on an address arithmetic bus 100. Such addresses are for memory and for special registers. Data on the bus 100 arrives there from either (a) the data bus 24 by way of a multiplexer 102, (b) registers 60, 64, 66, 78, 80, 82, 92 and 93 or (c) the address arithmetic unit 62. An address stored in the masters of the address latches is transferred into the slaves where it is applied to the address bus 40. The transfer of addresses from masters to slaves occurs once every machine cycle.

Address bus 40 is a 12-bit parallel bus for applying any address stored in the slaves of the address latches 99 to inputs of the special address decoder 45 and the address arithmetic unit 62. The address is applied also to the address inputs of the read only memory 20, the random access memory 22 and a 12-input to a 1-out-of-16 decoder 106 associated with the input/output latches 36.

Address Arithmetic Bus Structure

As shown in FIG. 3, the address arithmetic bus 100 is a twelve-lead but interconnecting the address arithmetic unit (AAU) 62, the address latches 99, the registers in interanl random access memory (IRAM) 61, the registers in temporary random access memory (TRAM) 73 and the multiplexer 102.

Some addresses are formed in the microcomputer by concatenating three nibbles of data from the data bus 24. These nibbles originate by reading them out of the read only memory 20 or out of the random access memory 22. They appear serially by nibbles on the data bus 24 and are concatenated by writing them into their respective nibble positions in one of the registers in memory 61 or memory 73.

The address arithmetic bus 100 and the connected circuits are arranged to generate memory addresses used in processing data in the microcomputer. Sets of transmission gates 111, 112, 113 are interposed in the bus leads so that the bus is separable into segments. Depending upon control signals applied to the transmission gates 111, 112 and 113 and to the multiplexer 102, bus segments 115, 116, 117 and 118 are opened selectively from one another so that simultaneous transfers of data from separate sources can occur through different segments. Such simultaneous data transfers enable a saving of operating time while accomplishing some processing functions.

Special Address Decoder

The special address decoder 45 of FIG. 3 includes circuitry for providing address decoding for the registers 31, 33, 35, 60, 64, 66, 78, 80 and 82 which have addresses mapped in addressable memory space. These registers have lengths different from one another and longer than the width of the data bus. All special addresses include information representing the appropriate length of the data. These addresses are assigned specifically for the purpose of simplifying decoding logic. When a register is addressed as a destination during the direct addressing mode, the special address decoder 45 decodes the address into an appropriate number of nibbles for the operand.

All of these registers use a full range of memory reference instructions. Without the special address decoding arrangement extra opcodes would be dedicated to such instructions.

Referring now to FIGS. 17 and 18, there is shown a logic schematic of the special address decoder 45. Outputs of the address latches 99 are connected by way of the address bus 40 to the inputs of the special address decoder 45 where a portion of the addresses are applied to inputs of special latches 451. The address information is latched into the special latches 451 once every machine cycle by a clock signal P1B. The portion of the address information is held in these special latches for the remainder of that machine cycle so that the information stored in the address latches 99 can be changed later on during that cycle while the special address decoder 45 continues to respond to the old information.

According to the assignment of special addresses, all of those addresses have the same six most significant bits 111100. When the applied address has those bits, the flip-flop 450 is set to produce the special address signal SPAD for the duration of the machine cycle.

If the special address is an address for one of the registers in the internal random access memory, that is indicated by the seventh most significant bit on address bus lead ADR 5. The information on address lead ADR 5 is combined with the signal SPAD in gates 452 for producing a signal ISPAD that controls switching of a pair of multiplexers MUX A and MUX B.

The multiplexer MUX A selects for transmission to decoding logic 453 signals on either the three address leads ADR 2, ADR 3 and ADR 4 or three leads CRAM 0, CRAM 1 and CRAM 2 from the control programmable logic array 70. The signals applied to the decoding logic 453 are decoded therein to produce a signal for selecting a specific one of the special registers located in the internal random access memory. The normal source is the signals on leads CRAM 0, CRAM 1 and CRAM 2.

The multiplexer MUX B selects for transmission to the control leads of multiplexer 102 signals DAL, DAM and DAH derived either from decoding the two lowest order bits of the address or from the control programmable logic array 70. The normal source is the signals from the array 70. Signal ISPAD switches the multiplexers MUX A and MUX B so that the portion of the address stored in the special latches 451 directly controls the selection of one of the six special registers in the internal random access memory. Such selection is accomplished by a three to six code converter in the decoder 453. Another portion of the address latched in the special latches directly controls the selection of one of three sets of transmission gates included in the multiplexer 102 of FIG. 3. This selection of the sets of transmission gates is controlled by a two to three code converter 454.

The multiplexers MUX A and MUX B are always producing their respective outputs. Input signals are switched from one set of inputs to the other by the control signals ISPAD and ISPADB.

In FIG. 18 there is a nibble override circuit which determines, at any time, the correct number of nibbles in the current operand. The information representing the correct number of nibbles is presented on multiplexer MUX C output leads NIB 1 and NIB 2 which connect with an input of comparator 71. Inputs to the multiplexer MUX C are applied from the processor control register 33 on leads GB 1 and GB 2 and from flip-flops 455 on leads RN 1 and RN 2. A latch 456 determines which one of the two inputs is coupled through the tranmission gates of multiplexer MUX C to the leads NIB 1 and NIB 2. A priority logic circuit 457 determines whether or not the latch 456 is set. It is set by the special address signal SPAD, a signal LDTA and either signal ADR 5 or some information from the DS register 86. Latch 456 is cleared by a signal CLR 0-6 during state 0-6.

A nibble formation logic circuit 458 determines which of the flip-flops 455 are set by the special address information. The registers having special addresses are assigned addresses so that this logic is minimized and so that the required number of nibbles can be decoded from a portion of the address. Each special register has a sequential group of addresses long enough to include a separate address for each nibble of the register. To facilitate such decoding and logic minimizations some addresses are not assigned in a continuous sequence of addresses for all of the registers. The second, fourth, fifth and sixth least significant bits in the addresses are assigned to registers so that the correct number of nibbles for each register is decoded and is stored in binary code in the flip-flops 455. These flip-flops are set during each occurrence of the signal LDTA. The nibble information on leads RN 1 and RN 2 is selected by the signal SPR from latch 456 whenever a special register is used during execution of an instruction.

After the initial special address, given in an instruction, is latched in special latches 450 and 451, it is decoded and determined to be a special address producing the signal SPAD. During each subsequent operation of the arithmetic logic unit, the special address, stored in the address latches 99, is incremented by the address arithmetic unit. The incremented address is stored back in the address latches for accessing the next nibble of the same special register. Such incrementing of the special address continues during the execution of the instruction until the controller tallies the counter 69 enough times to satisfy the comparator 71. Each tally of the counter 69 is in response to an operation by the arithmetic logic unit.

At the time the comparator 71 is satisfied that the number of nibbles, decoded from the initial special address by the nibble formation logic 458 and stored in the flip-flops 455, equals the number of nibbles processed by the arithmetic logic unit.

Figure 20:
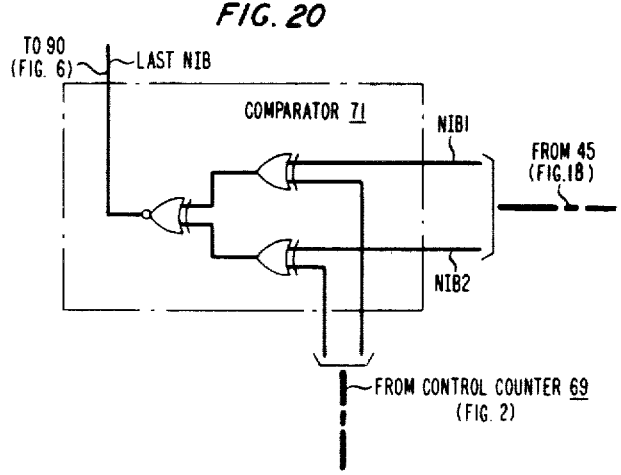
FIG. 20 is a logic schematic of a comparator.

Referring now to FIGS. 2 and 20, the comparator 71 receives inputs from the leads NIB 1 and NIB 2 as well as from the counter 69. The counter is clocked by the controller every time the arithmetic logic unit is turned on to operate on a nibble of data. When the state of the counter 69 in binary value equals the binary value represented on the leads NIB 1 and NIB 2, the comparator is satisfied. Thus when a special address is involved, the arithmetic logic unit has operated on a number of nibbles equal to the length of the register as decoded from the initial special address. Once the comparator 71 is satisfied, it generates a special address disabling signal LAST NIB that causes the controller to stop generating special addresses and to proceed with executing the rest of the instruction and any subsequent instruction.

While the special address is being incremented from the initial special address, the low, middle and high nibbles of the register are decoded, in the circuit of FIG. 17, by the logic circuit 454 from the two least significant bits of the special address. This produces one of three possible signals DAL, DAM and DAH in response, respectively, to the two least significant bits being 00, 01 and 10.

In FIG. 18, an input/output logic circuit 459 determines which of the input/output circuits is addressed by the initial special address. Outputs from the circuit 459 are applied to a direct memory access (DMA) and control circuit 85 in FIG. 1. Upon detection of the addresses for input/output circuits, the special address decoder enables signals IO-C0, IO-C1 and IO-C2 which control the read/write operations of the input/output registers through the direct memory access and control circuit 85. Through this arrangement decoder 45 circuitry of FIGS. 3, 17 and 18 provides address decoding for the input/output latches 36, the bidirectional input-/output has transmission gate 37, the inport transmission gate 38 and the programmed logic array encoder 39 of FIG. 1.

Once decoded in the special address decoder 45, the addressing of the registers 60, 64, 66, 78, 80 and 82 is controlled by other signals from the decoder 45. Signals on control lines 122 in FIGS. 3 and 17 determine which four of twelve gates in the multiplexer 102 are activated at any time. They enable transfers of data serially by nibbles from the data bus 24 to one of three groups of 4 leads of the address arithmetic bus 100 and vice versa.

When the registers 31, 33, 35, 60, 64, 66, 78, 80 and 82 are addressed as a destination in the direct addressing mode and the latches 36 and the transmission gates 37 and 38 are addressed as a destination, the special address decoder 45 overrides the processor control register 33 and controls the appropriate number of nibbles to be transferred.

The special address decoder 45, the control programmed logic array 70, the address arithmetic unit 62, the address latches 99 and parts of the central control arrangement automatically generate a sequence of addresses in response to information derived from a single special address. The sequence of addresses are multiple destinations for monadic and dyadic instructions.

Timing

Figure 16:
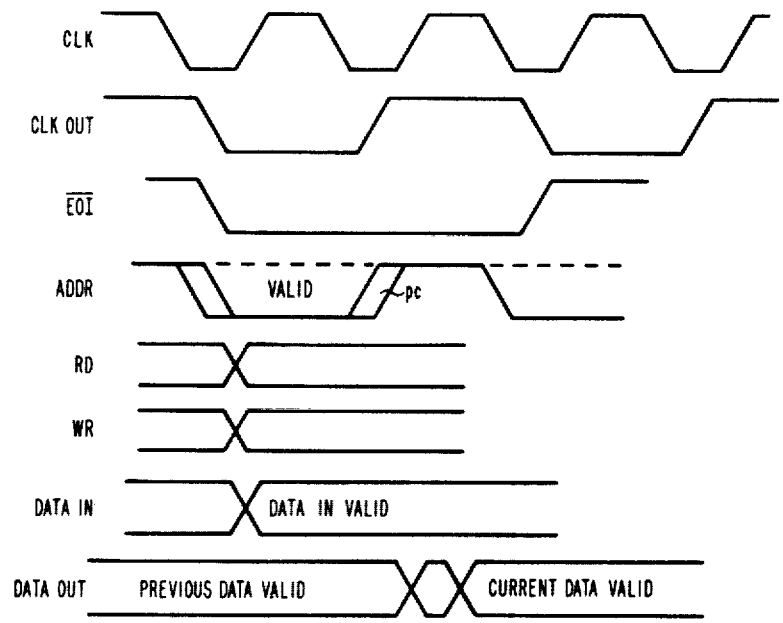
FIG. 16 is a timing diagram for the microcomputer of FIGS. 1-3.

Referring now to FIG. 16, the timing diagram shows the relationships among several signals occurring during operation of the microcomputer of FIGS. 1, 2 and 3.

The signal CLK is applied from an external source to the circuit of FIGS. 1, 2 and 3 for determining relative timing of operations performed by the microcomputer.

Signal CLK OUT is a timing signal produced by the controller for enabling various circuits within the microcomputer and various off chip peripheral circuits which may be connected to the microcomputer.

An end of instruction signal $\overline{EOI}$ is a control signal produced by the controller to indicate the termination of a sequence of events that are known as an instruction. A waveform designated ADDR represents when during the performance of an instruction the address on address bus 40 is valid. Associated read and write signals RD and WR also are shown at an appropriate time while the address is valid.

The signal RD is produced by the controller section of FIG. 2 for enabling a read operation from either the read only memory 20 or the random access memory 22, the input/output latches 36 or IRAM 61.

Signal WR produced by the controller section enables writing into either the random access memory 22, the input/output latches 36, or IRAM 61.

Signal DATA IN represents data read into the microcomputer from a peripheral device. Such data should be valid at the time shown.

Signal DATA OUT represents data read out of the microcomputer to a peripheral device. Such data will be valid at the time shown for current data in the waveform DATA OUT.

Now that the circuitry and timing of the machine have been described, the advantageous operation thereof can be appreciated by the following description of illustrative operations. For these operations, it is assumed without discussion that the read only memory 20 and the random access memory 22 are storing valid information that includes a legitimate program for the machine. The read only memory 20 stores a program start up sequence in a block of addressable memory commencing at a hexadecimal address x(000). Storage of information in registers will be described as required subsequently. It is further assumed that the machine has been reset putting the address x(000) into the program counter (PC) and into the address latches.

Exemplary Operation

Referring now to FIGS. 8 and 9, there is shown a sequence chart, or state diagram, for the illustrative operations of the machine. Each block in the sequence chart represents a state of the main control logic array and shows functions that occur during a specific machine cycle of an illustration. It is believed that the reader will better understand the operation of the processor by referring to the sequence chart while studying the illustrative operations subsequently described.

In the first illustrative operation, we will describe moving data into the direct memory access pointer register 78. Information is to be stored in the direct memory access pointer register 78 by an instruction MOV. As a result of such instruction, data from address locations x(111), x(112) and x(113) is moved to the direct memory access pointer register commencing at address x(F08). The latter address is the address of the low order nibble of the register 78. This is a special address that is decoded by the special address decoder 45 which controls transfer of three nibbles of immediate data into the register 78.

This data is fetched from the read only memory 20 and is transferred through the data bus 24 to the temporary register 27. The data goes through the arithmetic logic unit 30 without alteration and is applied back through the data bus to the address arithmetic bus 100 from which it is written into the register 78. There it is stored until a direct memory access operation commences. In the detailed sequence of operations to follow several wait states are present to allow the control PLA to decode the proper information for the next operation.

It is assumed that information stored in the processor control register 33 determines that each instruction operates on a two nibble operand. Therefore, all instructions not invoking a special register address operate on two nibbles of data requiring the use of the data bus twice.

After stepping through the program start up routine, the microcomputer is ready to process an illustrative instruction MOV.

The first state of the processor operation is state 0-3. The first nibble of the instruction from the address x(10D) held in the slaves of the address latches is fetched from the read only memory 20 and is transferred through the data bus 24 to the instruction register 32. The first nibble of information stored in the instruction register is the opcode representing the instruction MOV, which will move an initial address for direct memory access into the register 78. During this state, the processor also increments the address held in the slaves of the address latches and stores the result x(10E) in the program counter register 60 and in the master of the address latches 99. The processor then steps to state 0-C.

State 0-C is a wait state. The information in the slaves of the address latches merely is transferred to the masters thereof, and the processor steps on to state 0-4.

In state 0-4 of the second nibble of the instruction from the address x(10E) in the slaves of the address latches is fetched from the read only memory 20 and is transferred through the data bus to the destination/source register 86. Simultaneously the opcode is decoded and the latches MDLAT and ELAT are operated. For the instruction MOV, a special dyadic instruction, MDLAT and ELAT remain reset. A decision is made whether or not to fetch a second opcode based on the states of the latches MDLAT and ELAT. For this instruction, no second opcode is fetched. The two bit destination and source code specifies direct addressing and immediate data, respectively. The address in the slaves of the address latches again is incremented. The incremented address is stored in the program counter register 60 and in the masters of the address latches. Since a second opcode is not required for the instruction MOV, the processor steps to state 0-6.

In state 0-6, a wait state, the address in the slaves of the address latch is transferred to the masters thereof and the processor steps to state 1-F.

At this point in the execution of the instruction, the opcode has been fully decoded and the instruction identified. Address formation now begins. For dyadic instructions, the destination address is formed first.

In state 1-F, the processor fetches from the internal random access memory 61, the upper nibble of the address x(F08) for the direct memory access pointer register 78. This nibble is stored in the upper nibble of the temporary register 93, which has been designated by the data stored in the destination/source register 86. The processor then steps to state 1-B.

In state 1-B, the address in the program counter 60 is loaded into the masters of the address latches for pointing to the next nibble of the program, which is the low nibble of the address x(F08) for the register 78, the destination. The machine steps on to state 1-7.

In state 1-7, the third nibble of the instruction, i.e., the low nibble of the address x(F08), is fetched from the read only memory through the data bus 24 and the address arithmetic bus segments 118 to the low order nibble of the temporary register 93. The address in the slaves of the address latches is incremented in the address arithmetic unit 62 and the resulting incremented address is stored in the program counter and in the masters of the address latches. The processor steps to its state 1-9.

In state 1-9 the fourth nibble of the instruction, i.e., the middle nibble of the address x(F08), is fetched and stored in the middle nibble of the register 93. This completes the formation of the destination address, i.e., the address of the direct memory access pointer register 78, in the temporary register 93. The address in the slaves is incremented in the address arithmetic unit, and the result is stored in the program counter and in the masters of the address latches. The processor steps to its state 1-A.

In state 1-A the contents of the temporary register 92 is transferred into the masters of the address latches. This address is meaningless with respect to the program being executed. Since the instruction register contains information indicating that the instruction is a dyadic instruction and the flip-flop D (FIG. 6) is reset to zero, the processor steps to state 1-D for initiating formation of a source address in the temporary register 92. The source address is a direct address of immediate data in the read only memory 20.

In state 1-D the address in the temporary register 92 is transferred to the masters of the address latches, and the flip-flop D (FIG. 6) is set so that the next time through state 1-A the processor will not loop back through state 1-D. This is a wait state. The processor steps on to its state 1-F.

Since the source mode is immediate, the address stored in the program counter is transferred to the temporary register 92. This address points to the fifth nibble of the instruction, which contains the first nibble of the source operand. This source operand is the address which is to be stored in the direct memory access pointer register 78 and which indicates the initial storage location for a direct memory access operation. Because this is the formation of the source address for immediate data, the processor steps to state 1-A.

Now the processor is ready to commence fetching the source operand. In state 1-A, the address being stored in the temporary register 92 is transferred to the masters of the address latches. This is the address of the fifth nibble of the instruction, i.e., the first nibble of immediate data. This address x(111) is the address from which the initial address for direct memory access is obtained. Such data is obtained because the opcode indicates a dyadic instruction and the flip-flop D (FIG. 6) already is set. The processor steps to state 3-9.

In state 3-9, the contents of address x(111) is fetched from the read only memory and is transferred through the data bus to the temporary data register 27. The special address circuitry and the nibble override circuitry of FIGS. 17 and 18 are inactive because the source address is not a special address. Because this is a source, the data in the register 33 determines the number of nibbles to be processed. The address in the slaves of the address latches is transferred through the address arithmetic unit to the masters. The processor goes on to state 3-0.

In state 3-0, the address arithmetic unit 62 is enabled to increment the address in the slaves and store the resultant in the temporary register 92 and in the masters. This incrementation is performed in anticipation of a multiple nibble operand. The processor now steps on to its state 2-2.

In state 2-2, the incremented address, stored in the slaves of the address latches, is transferred to the program counter register 60 and to the masters in anticipation that the last arithmetic logic unit operation has been performed for the current instruction. Thus the address in the program counter points to the first nibble of the next subsequent instruction. The processor steps on to state 2-3.

In state 2-3 the 12-bit address x(F08) contained in the temporary register 93, which is the address of the low order nibble of the direct memory access pointer register 78, is transferred all at once through the bus 100 into the masters of the address latches 99. Since the address is for the low order nibble of the register 78, it is a special address which sets flip-flop 450 in FIG. 17 and thereby activates the special addressing circuits of FIGS. 17 and 18. The low nibble of the register 78 is addressed by way of control lines DP and DAL. Control line SPAD is high, and signals from the destination/source register 86 indicates direct addressing for the destination mode. At this time the nibble override circuit of FIG. 18 is prepared to override the nibble setting of register 33 as applied over leads GB 1 and GB 2 but it needs an enabling signal on the control line LDTA. A signal from the controller 70 increments the controller counter 69 to indicate that the arithmetic logic unit operation on one nibble of the operand is about to be completed. The processor steps to its state 2-4.

In state 2-4, the destination operand is fetched from the low order nibble of the register 78 and is transferred by way of the bus 100 and data bus 24 into the temporary data register 26 enabling signal LDTA and thereby activating the nibble override circuit of FIG. 18. Multiplexer MUX C now switches from its inputs GB 1 and GB 2 to the special address inputs RN 1 and RN 2. Since the special address is the register 78 and it includes three nibbles, the nibble override multiplexer MUX C remains switched this way until the end of the execution of this instruction when the signal CLR 0-6 from the control PLA 70 clears the latch circuit 456. The address of the low nibble of the register 78 residing in the slaves of the address latches, is transferred to the masters and the processor steps to state 2-0.

In state 2-0, the destination address stored in the slaves of the address latches is incremented to x(F09) and is stored in temporary address register 93 in anticipation of a multiple nibble operation. The arithmetic logic unit 30 is turned on with controls such that the data in the temporary register 27 appears unaltered at the output of the arithmetic logic unit. The operand stored in register 26 does not affect the output of the arithmetic logic unit during this state for this illustrative instruction. The processor steps on to its state 2-1.

In state 2-1 the arithmetic logic unit is held on and its output is transferred through the data bus, the multiplexer 102 and bus 100 into the location addressed by the slaves of the address latches. This is the address x(F08) of the low nibble of the direct memory access pointer register 78. The address x(F08) in the slaves of the address latches is transferred to the masters thereof.

At the finish of the just described arithmetic logic operation, the comparator 71 of FIGS. 2 and 20 compares the state of the control counter 69 with the number of nibbles presented by the nibble override circuit of FIG. 18. Since the destination is a three nibble register, the override circuit is calling for a three nibble operation but only one nibble has been completed. The processor steps on to state 1-A.

The operand fetch and arithmetic logic unit operations now are repeated twice from state 1-A through states 3-9, 3-0, 2-2, 2-3, 2-4, 2-0 and 2-1. There are some differences, however.

When the address is read from the temporary register 92 for the first repeat of state 1-A, the address is x(112). The operand fetched from that address in read only memory is subsequently loaded in the middle nibble of the register 78 by way of the middle leads of bus 100 and under control of signal DAM. The address for such middle nibble of the register 78 is generated automatically by the address arithmetic unit 62 and is stored in the register 93, during state 2-0, in response to signals produced by the special address decoder 45, the controller counter 69, the comparator 71 and the control programmable logic array 70.

When the address is read from the temporary register 92 for the second repeat, the address is x(113). The operand fetched from there is loaded into the high order nibble of the register 78 by way of the high order leads of bus 100 and under control of signal DAH. The address for the high order nibble of the direct memory access pointer register 78 also is generated automatically by the same combination of circuitry.

Throughout these latter two loops used for loading the operand into the middle and high order nibbles of the direct memory access pointer register, the nibble override circuit of FIG. 18 is active and calling for a three nibble operation. The comparator 71 of FIGS. 2 and 20 now checks its inputs from the nibble override circuit and the number of operations counted by counter 69. At the end of the third loop, the comparator is satisfied producing a special address disabling signal LAST NIB and the processor thereafter steps from state 2-1 into state 0-1.

State 0-1 is the final state of the first instruction. The address in the program counter register 60 therefore is transferred through the bus 100 to the masters of the address latches in preparation for addressing the first nibble of the next instruction. The processor steps on to state 0-3, the first state of the next subsequent instruction.

The foregoing description describes an embodiment of the invention. This embodiment together with other embodiments obvious to those skilled in the art are considered to be within the scope of the invention.

I claim:

1. An address generation arrangement for generating in an address register (99) a succession of sequential addresses in addressable memory space for accessing operands to be processed by arithmetic logic unit (30) operations, the sequential addresses being generated by means (62) responsive to an initial address stored in the address register and arranged for periodically incrementing the address stored in the address register, the succession of addresses being terminated by means (69, 71, LAST NIB) for disabling the periodic incrementing of the address stored in the address register CHARACTERIZED IN THAT a control counter (69) counts operations of the arithmetic logic unit, and the disabling means (69, 71, LAST NIB, 458, 455) respond to at least a portion of the initial address (455 and 458) and a count in the control counter of the number of arithmetic logic unit (30) operations for producing a signal (LAST NIB) which terminates the periodic incrementing of the address stored in the address register at the conclusion of the generation of a predetermined number of sequential addresses, the predetermined number being decoded (458) by the disabling means from the portion of the initial address.

2. An address generation arrangement in accordance with claim 1 FURTHER CHARACTERIZED IN THAT a decoder (458) included in the disabling means decodes a portion of the initial address into a binary representation of the predetermined number of addresses in the consecutive sequence of addresses.

3. An address generation arrangement in accordance with claims 1 or 2 FURTHER CHARACTERIZED IN THAT a signal generated during each operation of the arithmetic logic unit increments the state of a counter (69), and a comparator (71) responsive to the predetermined number and the state of the counter produces the disabling signal when the state of the counter equals the predetermined number.

* * * * *